(12) United States Patent
Holmes et al.

(10) Patent No.: US 8,554,364 B2
(45) Date of Patent: Oct. 8, 2013

(54) APPARATUS FOR SECURING DRAWER CONTENTS

(75) Inventors: William K. Holmes, San Diego, CA (US); Kent V. Savage, Morrow, OH (US); Charles A. Tyack, San Diego, CA (US)

(73) Assignee: Supplypro, Inc., San Diego, CA (US)

( * ) Notice: Subject to any disclaimer, the term of this patent is extended or adjusted under 35 U.S.C. 154(b) by 771 days.

(21) Appl. No.: 10/636,368

(22) Filed: Aug. 7, 2003

(65) Prior Publication Data
US 2004/0104652 A1 Jun. 3, 2004

Related U.S. Application Data

(60) Provisional application No. 60/401,832, filed on Aug. 7, 2002.

(51) Int. Cl.
*G06F 17/00* (2006.01)
*A47B 88/00* (2006.01)

(52) U.S. Cl.
USPC ........... 700/236; 700/237; 700/243; 700/232; 700/242

(58) Field of Classification Search
USPC ................ 70/242; 221/12, 97–100, 1–312 C; 312/109, 209, 291, 292, 293.3, 215, 312/333, 319.5; 700/231–244
See application file for complete search history.

(56) References Cited

U.S. PATENT DOCUMENTS

| | | | |
|---|---|---|---|
| 5,087,107 A | 2/1992 | Fumanelli | |
| 5,392,951 A | 2/1995 | Gardner et al. | |
| 5,445,294 A | 8/1995 | Gardner et al. | |
| 5,661,978 A * | 9/1997 | Holmes et al. | 62/3.6 |
| 5,716,114 A | 2/1998 | Holmes et al. | |
| 5,745,366 A * | 4/1998 | Higham et al. | 700/242 |
| 5,805,456 A * | 9/1998 | Higham et al. | 700/236 |
| 5,883,806 A * | 3/1999 | Meador et al. | 700/244 |
| 5,905,653 A * | 5/1999 | Higham et al. | 700/244 |
| 5,927,540 A * | 7/1999 | Godlewski | 221/2 |
| 5,940,306 A | 8/1999 | Gardner et al. | |
| 6,011,999 A * | 1/2000 | Holmes | 700/231 |
| 6,065,819 A | 5/2000 | Holmes et al. | |
| 6,109,774 A | 8/2000 | Holmes et al. | |
| 6,116,461 A * | 9/2000 | Broadfield et al. | 221/98 |
| 6,175,779 B1 * | 1/2001 | Barrett | 700/242 |
| 6,338,007 B1 | 1/2002 | Broadfield et al. | |
| 6,367,653 B1 | 4/2002 | Ruskin et al. | |
| 6,385,505 B1 * | 5/2002 | Lipps | 700/231 |
| 6,658,322 B1 * | 12/2003 | Frederick et al. | 700/236 |
| 6,811,232 B2 * | 11/2004 | Doan et al. | 312/291 |

FOREIGN PATENT DOCUMENTS

GB 12590 0/1913

* cited by examiner

*Primary Examiner* — Michael K Collins
(74) *Attorney, Agent, or Firm* — Michael Best & Friedrich LLP

(57) ABSTRACT

A cabinet having a plurality of drawers, each drawer having at least one compartment. The cabinet includes a computer and a panel pivotally coupled to one of the drawers. The panel is disposed in a covering relationship with the compartments within the drawer and includes at least one opening. The opening corresponds with the compartment. A cover is pivotally connected to the panel and covers the opening. A locking mechanism is interconnected with the drawer and the cover. The locking mechanism receives a signal from the computer to position it in one of a locked and unlocked position.

19 Claims, 3 Drawing Sheets

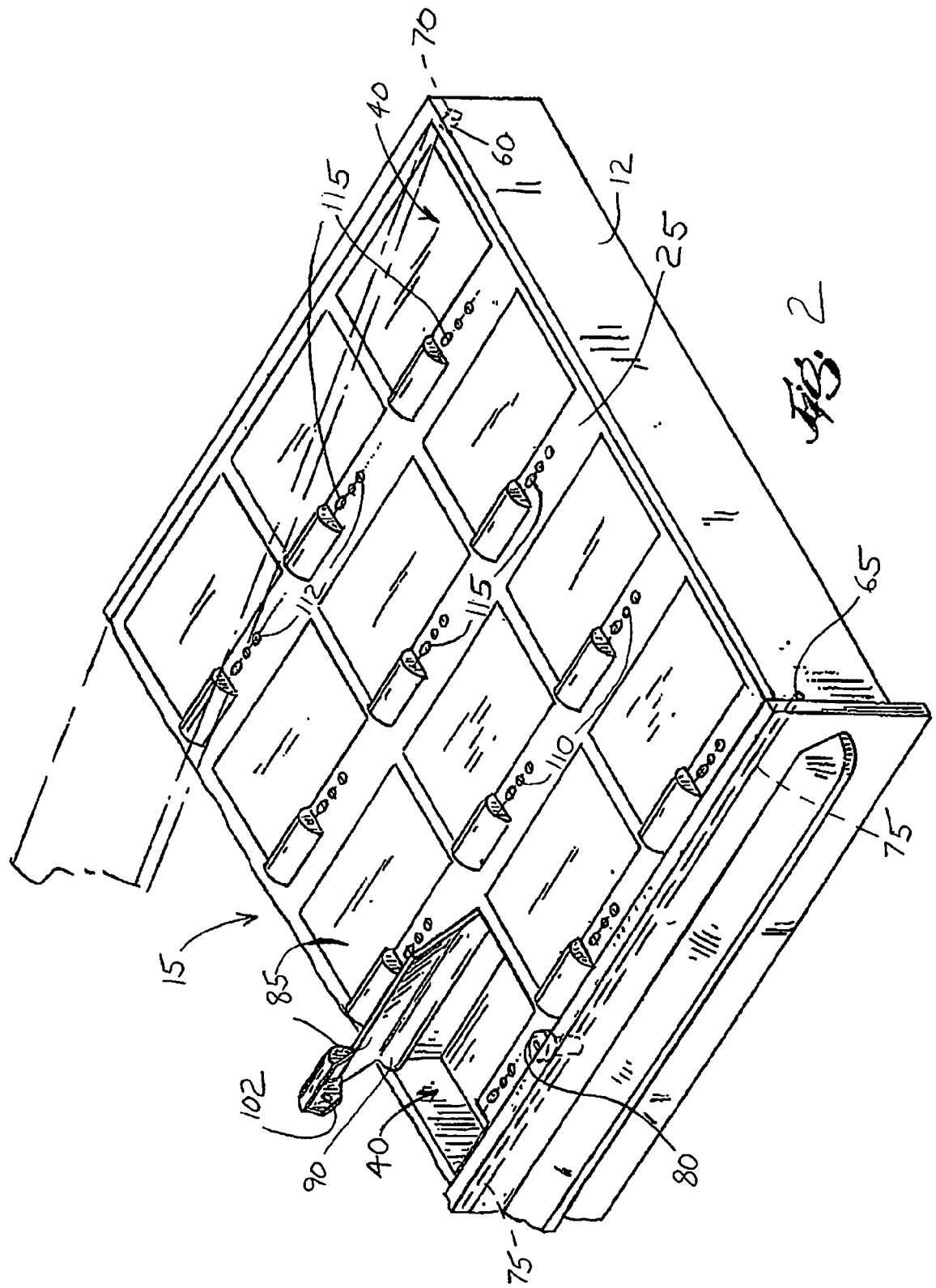

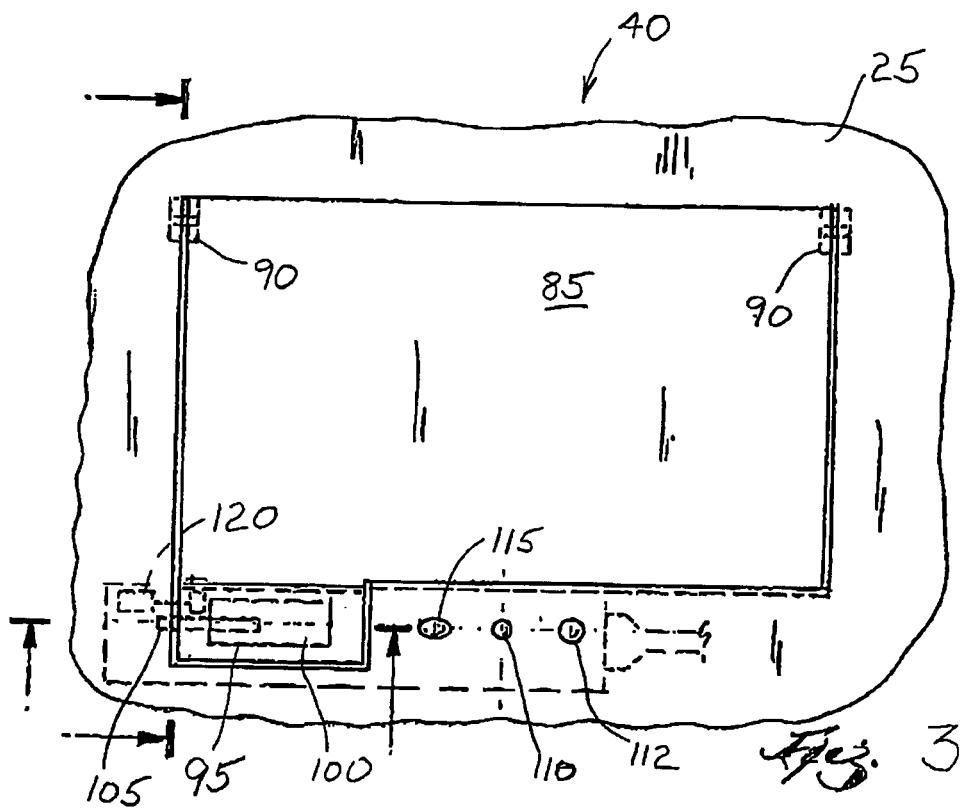
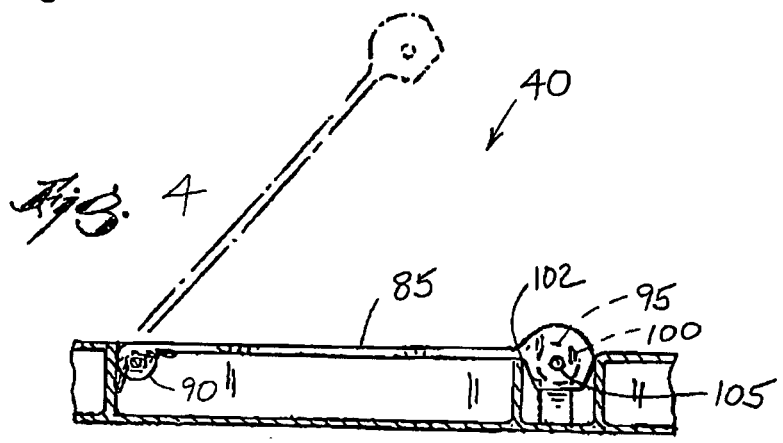
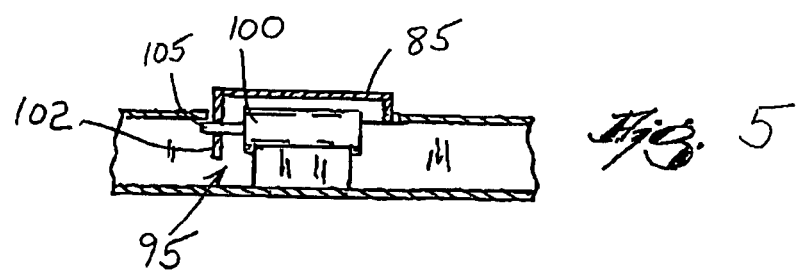

APPARATUS FOR SECURING DRAWER CONTENTS

CROSS-REFERENCE TO RELATED APPLICATIONS

This patent application claims priority to U.S. Provisional Patent Application No. 60/401,832, filed Aug. 7, 2002, which is incorporated herein by reference in its entirety.

BACKGROUND OF THE INVENTION

The present invention relates to storage cabinets, and particularly to multi-compartment storage cabinets used to store items. More particularly, the present invention relates to storage cabinets having computer-controlled access.

Conventional cabinets are often used in factories, shops, plants, stores or other sites to store small tools, parts, ingredients or other items. The cabinets allow for better organization and space utilization, while simultaneously improving worker productivity by eliminating time wasted looking for items.

Typical cabinets of the type described herein are often used to store consumables or small parts that are commonly used within a particular factory or shop. Because these parts are purchased and stored in bulk, accurate inventory and costing of the products made using these parts is difficult. In addition, misappropriation of the parts is difficult to detect or prevent.

In other situations, the use of a cabinet is desirable, however, due to the nature of the items to be placed in the cabinet, security precludes their use. For example, dangerous elements such as mercury may be needed to assemble a product such as a mercury switch. However, mercury is too hazardous to allow uncontrolled access within a factory. Therefore, the components necessary to make a complete switch cannot be securely stored within the cabinet. Instead, the materials are typically stored in a remote secure location that requires the worker to waste time and effort retrieving them. To save time, workers often request excessive materials resulting in an increase in wasted material, time, and risk.

SUMMARY OF THE INVENTION

The present invention provides a retrofit kit for controlling the contents within a preexisting cabinet having a drawer, the drawer having at least one compartment. The kit includes a computer and a panel coupled to the drawer. The panel substantially covers the compartment within the drawer and includes at least one opening. The panel opening corresponds with the drawer compartment. The kit also includes a cover movably connected to the panel and substantially covering the opening. A locking mechanism is interconnected with the cover to selectively lock and unlock the cover. The locking mechanism receives a signal to position the locking mechanism in one of a locked and unlocked position.

In another embodiment, the invention provides a kit for controlling the contents of a compartment. The kit includes a computer and a panel substantially covering the compartment. The panel includes at least one opening that corresponds with the compartment. The kit also includes a cover movably connected to the panel and substantially covering the opening. A locking mechanism is interconnected with the cover to selectively lock and unlock the cover. The locking mechanism receives a signal to position the locking mechanism in one of a locked and unlocked position.

In another embodiment, the invention provides a cabinet including a plurality of drawers, each drawer including at least one compartment. A panel connects to the drawer and substantially covers the compartment. The panel includes at least one opening, the opening corresponding to the compartment within the drawer. At least one cover movably connects to the panel to substantially cover the opening. At least one locking mechanism interconnects the cover and is selectively movable between a locked and an unlocked position. When in the locked position, the cover covers the opening and when in the unlocked position the cover is movable to expose the compartment.

In preferred constructions, each drawer includes a number of compartments and an equal number of openings, covers, and locking mechanisms.

In still another embodiment, the invention provides a method of assembling a product using a cabinet having a plurality of compartments containing items. Each compartment includes a switch, an LED, and a locking mechanism. The cabinet also includes a graphical user interface and a selection device. The method comprises the acts of initiating a display on the graphical user interface and using the selection device to indicate a desired item. The method also includes the acts of illuminating at least one LED to guide a user to the desired one of the plurality of compartments, actuating the locking mechanism, and removing the desired item.

In preferred embodiments, the graphical user interface displays a procedure or a drawing and the selection device is a touch screen.

BRIEF DESCRIPTION OF THE DRAWINGS

The detailed description particularly refers to the accompanying figures in which:

FIG. 2 is a perspective view of a drawer of the cabinet of FIG. 1;

FIG. 3 is a top view of a compartment within the drawer of FIG. 2;

FIG. 4 is a side view of the compartment of FIG. 3; and

FIG. 5 is a front sectional view of a portion of the compartment of FIG. 3.

DETAILED DESCRIPTION OF THE DRAWINGS

Figure 1:
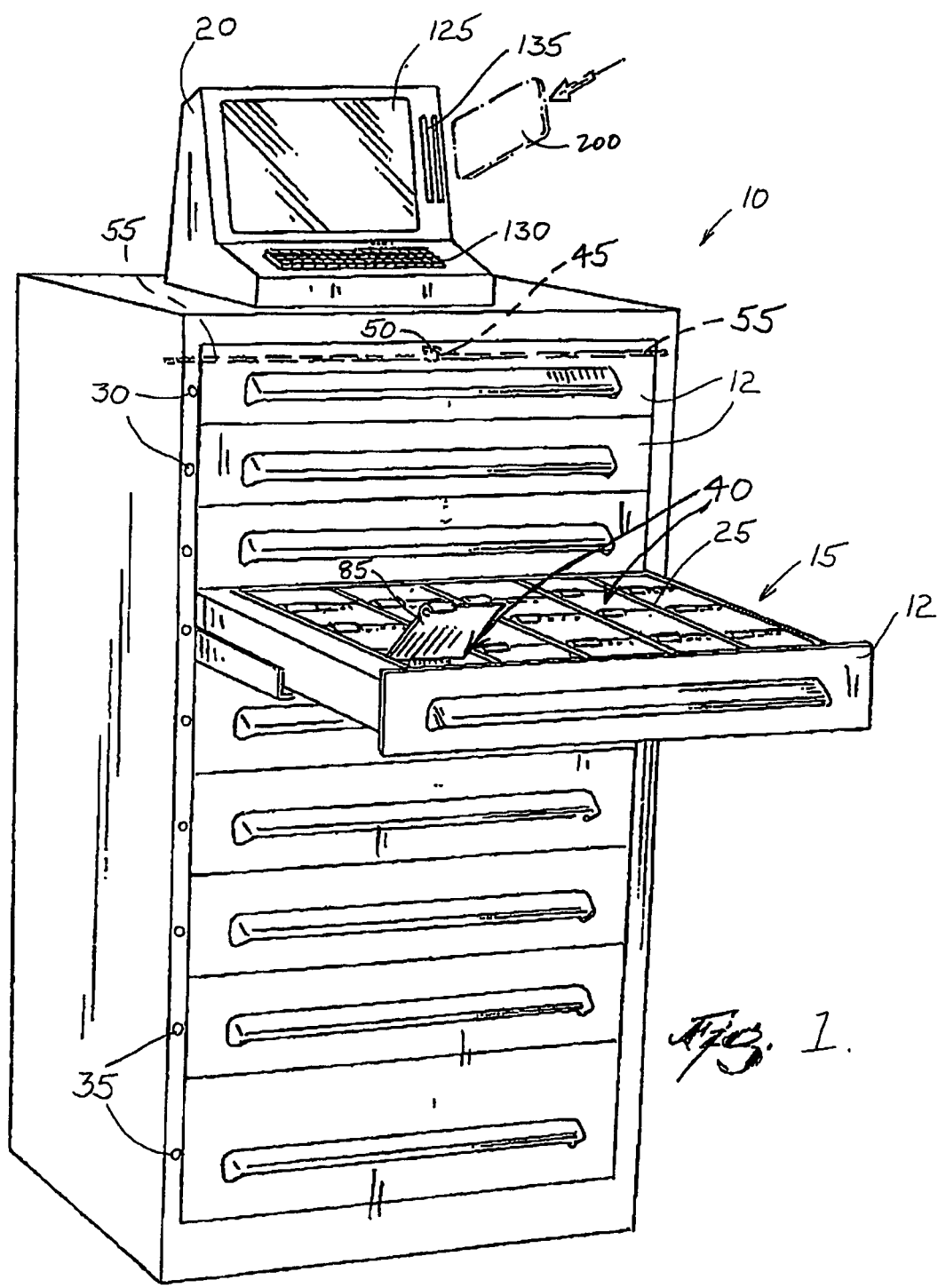
FIG. 1 is a perspective view of a cabinet including the panels embodying the present invention.

FIG. 1 illustrates a cabinet 10 having a plurality of drawers 12 adapted to store items and fitted with a kit 15 of the present invention. The kit 15 includes a control center 20, a plurality of panels 25, and a plurality of indicators 30. The indicators 30 are generally light emitting diodes (LED) that illuminate to aid the user in finding the desired item. For example, the cabinet 10 of FIG. 1 includes a plurality of drawer LEDs 35 positioned vertically down the front of the cabinet 10 adjacent the drawers 12. One LED 35 is positioned adjacent each drawer 12. When a user requests an item, the LED 35 that corresponds to the drawer 12 that contains the item is illuminated to quickly guide the user.

The term "item" as used herein includes any physical thing that may be used by a user. Items include but are not limited to parts, tools, chemicals, substances, food ingredients, consumables, etc. In addition, terms such as "tool" or "part" may be used to describe specific examples of uses of a cabinet as described herein, however, these terms should not be read as limiting the cabinets use to tools or parts. Instead, the terms "tool" and "part" may be read broadly to include any physical item.

The cabinet 10 is similar to many cabinets currently used in industry worldwide. Stanley-Vidmar, of Allentown, Pa. sells a cabinet under model number SEP2025AL that is similar to the cabinet 10 illustrated in FIG. 1. In the illustrated embodiment, the cabinet 10 includes nine drawers 12, with more or less drawers 12 being possible. In addition, each drawer 12 is subdivided into a plurality of compartments 40. For example, the drawer 12 shown in the open position in FIG. 1 is subdivided into twenty compartments 40. Other constructions may employ a drawer 12 or drawers 12 that are not subdivided, but instead provide one large compartment 40. Still other constructions may employ more or less than twenty compartments 40. The walls subdividing the drawers are often movable to allow the user to configure the compartments 40 as necessary for a particular use.

It should be noted that while the term cabinet is used throughout the description to describe the preferred embodiment, the term cabinet should not be read as limiting the invention. For example, other constructions secure the contents of single individual drawers built into walls or other structures. In another construction, the present invention is built into a mechanic's van to aid in the location of items therein. In still another construction, the apparatus of the present invention protects the contents of a mechanic's mobile cabinet. As one having ordinary skill in the art will realize, the invention is capable of securing the contents within any compartment and is capable of guiding the user to the correct compartment no matter what supports the compartment. Therefore, the invention should not be limited to cabinets alone.

Each drawer 12 slides into and out of the cabinet 10 to provide a user with access to the parts, tools, or other items stored within the drawers 12. In some cabinets 10, a lock mechanism 45 allows the user to lock all of the drawers 12, thereby preventing unwanted removal of the cabinet's contents. Many lock mechanisms 45 are available that secure the drawers 12 of cabinets 10. FIG. 1 illustrates a lock mechanism 45 that includes a key 50 that moves two bars 55 into engagement with a mechanism that prevents the drawers 12 from opening. A still simpler device includes an L-shaped piece (not shown) connected to the cabinet at a hinge. The L-shaped piece covers a portion of the drawers when in the locked position to prevent their opening. Other constructions employ a solenoid-actuated lock that locks all of the drawers. The solenoid-actuated lock may include a single solenoid capable of locking or unlocking all of the drawers or may include multiple solenoids, each capable of locking or unlocking one or more of the drawers.

The cabinet 10 illustrated is stationary; that is, it is placed directly on the floor or onto another cabinet within a factory, shop, or storage area. Other constructions include cabinets 10 placed on castors or wheels to provide mobile sources of items. In the case of a mobile cabinet, a mobile power supply may be included with the kit 15 to allow the cabinet to be positioned remote from a power supply.

Turning to FIG. 2, a drawer 12 is illustrated removed from the cabinet 10 of FIG. 1. The drawer 12 includes one of the panels 25 of the kit 15 of the present invention connected to the drawer 12 by a hinge 60 at the rear of the panel 25 and a lock-rod 65 at the front. The hinge 60 includes a rod 70 that extends the full width of the drawer 12 and engages both the drawer 12 and the panel 25. The rod 70 attaches in a manner that allows the panel 25 to pivot about the rod 70. Other constructions use two or more smaller hinges that attach to both the rear of the drawer 12 and the panel 25. In still other constructions, the panel 25 may include two pins sticking out a back edge of the panel 25 and into holes in the rear wall of the drawer 12. The holes are sized such that the pins need not be positioned in the holes only perpendicularly to the holes. The pins can angle back and forth in the holes and permit the panel 25 to be opened and closed relative to the drawer 12. In this way, the pin/hole combination serves as a "hinge" at the back of the drawer.

Again referring to FIG. 2, the lock-rod 65 includes two rods 75 that connect to a key-mechanism 80 or other security device that is actuatable by only certain users (e.g., users with the key). When rotated into the locked position, the rods 75, which slidably connect to the panel 25, extend into the side of the drawer 12. Thus, the rods 75 prevent the lifting or removal of the panel 25 without disassembling the hinge 60 or causing damage. When the key 80 is rotated to the unlocked position, the rods 75 retract and disengage the drawer 12, thereby allowing the panel 25 to be opened by pivoting it about the hinge 60.

In another construction, an electronic locking device is employed. One or more solenoids (not shown) engage the panel 25 and the drawer 12 in the deenergized state. A user inputs a code into the control center 20 (FIG. 1) or other controller to indicate sufficient rights to gain access to the drawer 12. The solenoid energizes to disengage from the drawer 12 and allow access. While the lock mechanism has been described as using a code, many other methods of determining a user's identity (e.g., biometrics, such as fingerprint identification, etc.) are contemplated by the present invention.

Other constructions employ still other locking arrangements. For example, one construction employs one screw (not shown) at each corner to attach the panel 25 to the drawer 12. A tab that can rotate out of its covering position with a key covers one or more of the screws. Thus, the panel 25 cannot be removed without using the key to rotate the tab and reveal the screw. In yet another construction, a simple padlock locks the panel 25 to the drawer 12 and can only be removed with the proper key or combination. Additionally, the panel 25 could removably slide onto the drawer 12 or could be fixed to the drawer 12. As will be readily apparent to those of ordinary skill in the art, many ways of securing the panels 25 to the drawers 12 are available.

The openable panel 25 allows for quick restocking, inventory, or manual override (e.g., in the event of power failure), etc., of the compartments 40 within the drawer 12. A user with sufficient rights or access privileges opens the panel 25 to gain access to all of the compartments 40. The user can easily add or remove items from some or all of the compartments 40, as desired.

Still referring to FIG. 2, a plurality of covers 85 attach to the panel 25, or are formed as part of the panel 25, in a pattern that matches the compartment arrangement within the drawer 12. Because many different drawer patterns are available in existing cabinets 10, many different panels 25 are necessary and contemplated by the invention. Referring to FIGS. 2-5, each of the covers 85 attaches to the panel 25 with a hinge 90 and locking mechanism 95. The hinge 90, positioned near the rear of each cover 85, allows the cover 85 to pivot open, thereby providing access to the items within the compartment 40. The locking mechanism 95 engages the cover 85 and holds it in a closed position unless the user successfully requests access to the compartment 40. Once access is successfully requested, the locking mechanism 95 releases the cover 85 and allows the user to retrieve the desired item. Although FIG. 2 illustrates the panel 25 hinged to the drawer 12 at the rear, it will be readily apparent to those of ordinary skill in the art that the panel 25 may be connected to the drawer at the front or along a side.

The panels 25 can be manufactured from any suitable material (e.g., plastics, metals, ceramics, composites, wood, etc.) with steel and plastic being the preferred materials. The covers 85 are preferably formed from solid steel sheet, particularly if warranted by the value of the materials stored therein. Other constructions use clear plastic to provide the user with a view of the items within the compartments 40. Still other constructions use opaque plastics or other materials for the covers 85.

The locking mechanism 95, best illustrated in FIGS. 3-5, includes a solenoid 100 positioned to engage an aperture in an extension 102 of the cover 85 when the cover is in the closed position. The solenoid 100 receives a signal when a user successfully requests an item. The solenoid plunger 105 retracts and disengages from the cover 85. In some constructions, a spring or magnetic device biases the cover 85 open to aid the user in opening or finding the correct compartment 40.

Also included with the kit 15 are take and return switches 110, 112, a compartment LED indicator 115, and a photodetector, mechanical switch, or other detector 120 for each compartment 40. The take and return switches 110, 112 aid the control center 20 in monitoring the quantity of items within each compartment 40. Each time a user actuates the take switch 110 (and subsequently opens the cover 85 associated with the compartment 40), the control center 20 records the removal of a single item from the open compartment 40. When a user actuates the return switch 112, the control center 20 registers an increase in the quantity of items within the compartment 40. Alternatively, each compartment 40 could contain only a single item, so that a user would not need to actuate take and return switches 110, 112. Instead, the control center 20 would record the removal of an item (and the vacancy of that compartment 40 thereafter) whenever a cover 85 is opened.

In preferred constructions, the take and return switches 110, 112 signal the solenoid 100 to energize to open the desired compartment 40. In other constructions, the control center 20 signals the solenoid 100 to energize and open the compartment 40.

The take and return switches 110, 112 can be simple buttons or toggle switches. However, other constructions employ other devices to indicate when an item is removed or replaced. For example, one construction uses an electromagnetic or light curtain covering the opening. When the user removes or replaces a part, the curtain is broken and a signal is sent to the control center to register the removal or replacement of a part. Other constructions use magnetic detectors, or weight or pressure sensors to determine when a part is removed from the compartment 40. Still other constructions may employ embedded chip technology to detect the removal of a part. Each part or an attached label contains a microchip (such as RFID), or other device or element, that can be detected by sensors near each compartment. The removal is detected by the sensors and registered.

The photodetector 120 sends a signal to the control center 20 to indicate that the compartment cover 85 is open. While a photodetector 120 is illustrated in FIGS. 4 and 5, other types of detectors (proximity probes, magnetic probes, etc.) will also perform the function of the photodetector 120. In some constructions, the control center 20 monitors the photodetector signal to verify that the correct compartment 40 is open and that it is successfully closed following use. In addition, some constructions use the photodetector 120 to monitor the duration that a compartment 40 is open. If a compartment 40 remains open for a duration that exceeds a preset limit, the control center 20 initiates an alarm or locks the cabinet drawers 12 and covers 85 to prevent access. Additionally, the status (open or closed) of each of the panels 25 or each of the drawers 12 could be monitored with photodetectors.

The compartment LED indicators 115 within the drawers 12 are positioned adjacent the various compartments 40. When a user successfully requests an item, the LED 115 adjacent the compartment 40 containing the item illuminates to quickly guide the user to that compartment. While not necessary for the security provided by the kit 15, the LEDs 115 facilitate improved worker productivity by reducing the time spent looking for a particular item.

FIG. 1 illustrates the control center 20, which includes a video display 125, a microprocessor, a memory device, and a data storage device, all preferably housed within control center 20. Also included are a keyboard 130, and a card reader 135. The control center 20 runs a program that both regulates access to the components within the cabinet 10 and maintains an accurate inventory of the items within the cabinet 10. Furthermore, the program can monitor the rate of use of specific components, the length of time the items have been in a particular compartment 40, and the person or persons accessing the cabinet 10. Generally, the program is stored on the control center's data storage device for execution by the microprocessor and the memory device. However, other constructions may employ a program that is stored in a remote location, such as a server, and is downloaded when needed. Still other constructions may employ a "dumb" display terminal that simply displays a program that is executed at a remote location. Further, the control center 20 is shown on top of the cabinet 10. However, the control center 20 may be remote from the cabinet 10. Also, as mentioned, the control center 20 can be used to monitor many parameters concerning the cabinet 10. However, it should be understood that the control center 20 can be used to monitor various parameters concerning multiple cabinets 10, both proximate to and remote from the control center 20.

To access the cabinet 10, the user swipes a card 200 through the card reader 135 or inputs a user identification code and/or a password into the control center 20 via the keyboard 130. If the person has the proper rights, the video display 125 presents a user interface that facilitates access to the items within the cabinet 10. A graphical user interface (GUI) displays a list of items available or another representation that facilitates the proper item choice. For example, a factory may provide a cabinet 10 that contains all of the necessary replacement parts and special tools needed to disassemble, repair, or build a particular component such as an engine or pump. The GUI would present an assembly procedure including drawings or special tools needed. When the user indicates that a step requiring a special tool has been reached, the proper drawer 12 is indicated and the LED 115 indicating the proper compartment 40 illuminates. Thus, the cabinet 10 acts to assure that the proper tools and parts are used to assemble a product or sub-assembly.

In another example, the cabinet 10 acts as a spare parts repository for use in rebuilding old devices or sub-assemblies. As the rebuild progresses, assembly drawings are displayed in the GUI. A touch screen allows the user to touch the desired replacement part on the screen. The touch screen interfaces with the control center 20 to illuminate the proper drawer and compartment LED's 35, 115 to guide the user to the correct part. In some constructions, the control center 20 also signals the proper solenoid 100 to energize and open the compartment 40.

In another construction, embedded chip technology allows a user to waive a card past a detector to gain access to the cabinet 15. In still other constructions, a biometric device determines user identity based on biological characteristics (e.g., face, fingerprints, hand geometry, handwriting, iris, retinal, vein, or voice, etc.) and replaces the card reader 135. The level of security desired determines the level of authentication required to gain access to the cabinet 10. Furthermore, a mouse or other input device may replace the keyboard 130 and/or touch screen 125. In one construction, a voice recognition module determines which item the user has requested.

The microprocessor of the control center 20 may be part of a computer including memory, input/output devices, and information storage devices. In other constructions, the microprocessor interfaces with a network to retrieve and store information, thereby centralizing control of several cabinets 10. In still other constructions, the control center 20 is a central computer or server and each cabinet 10 or group of cabinets 10 interface with it through a "dumb" terminal. The network interface may be wireless to facilitate easy movement of the cabinets 10 throughout a facility.

In use, the cabinet 10 controls access to the parts or items contained therein, tracks who is accessing the cabinet 10, and maintains an accurate inventory of the items. In addition, the cabinet 10 can be programmed to track project or job numbers, tool usage, or any other information desired, when items are accessed. This information can be used to aid in determining cost, waste, productivity, return of tools, or any other parameter desired.

To retrieve an item, a user first accesses the cabinet 10. Many methods have been described and are contemplated for this step. The specific method used is dependant on the level of security desired and the cost of implementing the system.

Once accessed, a GUI is displayed that facilitates the choice of the item within the cabinet 10. Again, multiple techniques of displaying items, from a simple list to a complicated assembly drawing, are contemplated. Once the user identifies the item, the choice is input into the microprocessor. This can be done by pointing to the item with a mouse, selecting the item from a list, touching a touch screen, or typing in an identifier such as a part name or number. In another construction, voice recognition technology allows the user to state the name or number of the desired part. In still other constructions, the user simply actuates the take switch 110 to indicate which part is desired.

Once input, the microprocessor or remote computer determines the drawer 12 in which the item is located and actuates an indicator 35. The indicator 35 illustrated is an LED. The user opens the appropriate drawer 12 to expose the compartments 40 within the drawer 12. A second indicator 115, again an LED in the illustrated construction, is illuminated near the compartment 40 containing the desired item. In addition to illuminating the two LEDs 35, 115, the computer or microprocessor in some constructions also actuates the appropriate solenoid 100 to unlock the cover 85 of the desired compartment 40. The user is now free to open the compartment 40 and remove the desired item in the desired quantity. In preferred constructions, the computer illuminates the LEDs 35, 115 to guide the user to the proper compartment and the user actuates the take or return switch 110, 112 to energize the solenoid 100 and open the compartment.

It should be noted that while LEDs have been described as the indicators, many other types of indicators are contemplated (e.g., conventional lights, flags, sounds, liquid crystal displays (LCD), etc.).

After removing the item, the user actuates the take switch 110 a number of times corresponding to the number of items taken. (As mentioned, if only one item is stored in each compartment 40, inventory can be monitored based on the opening of a cover 85 alone.) For example, if five items are removed, the take button 110 is depressed five times. Alternatively, the take button could be actuated once and the number of items taken could be entered into the computer. If, on the other hand, the user makes a mistake and depresses the take button 110 six times, the user simply needs to depress the return switch 112 once to correct the number taken to five. Thus, the control center 20 is able to maintain accurate control over the inventory within the cabinet 10. In other constructions, other sensors are employed to aid in inventory control. For example, one construction includes a pressure sensor or force cell disposed below the compartment. The sensor determines the weight of the objects within the compartment 40. The control center 20 or other computer uses the weight of the individual items and the weight within the compartment 40 to calculate the quantity of items within the compartment 40, and thus the quantity taken.

In the application described above, in which the drawers 12 are filled with parts and tools needed to assemble a component. The cabinet 10 improves quality control while also controlling inventory and assuring that the proper parts are used. The drawers 12 and cabinets 10 are prepared based on customer orders and sent to the shop floor for assembly. Minor design variations or model changes are easily accommodated by supplying the proper parts within the cabinet 10. By using the cabinet 10 in this manner, the employee performing the assembly must follow the procedure displayed on the video display 125 in order to get the parts needed, thus improving the quality, accuracy, and speed of product assembly.

When the cabinets 10 are used as spare parts repositories, the program tracks which parts or components are used for which job, thereby assuring that the customer is charged for the parts actually used.

In some applications, the cabinet 10 secures hazardous or dangerous components, thereby providing the needed security while still facilitating efficient assembly of the products using these components. Rather than requiring a worker to request these substances from a storage area the worker simply requests them from the secure cabinet. If the worker has sufficient training, and rights, the cabinet releases the substances to that worker.

One construction of the kit 15 is adapted to retrofit into preexisting cabinets. As such, a variety of panel configurations are available to match the preexisting drawer configurations. In other constructions, the kit is installed by an original equipment manufacturer (OEM) as part of the cabinet or other product (e.g., mechanics van, drawers, or mechanics mobile cabinet).

Although the invention has been described in detail with reference to certain preferred embodiments, variations and modifications exist within the scope and spirit of the invention as described and defined in the following claims.

What is claimed is:

1. A kit configured to be added to a cabinet and for controlling contents within the cabinet, the cabinet holding a movable drawer defining a drawer height, the drawer having perimeter walls, a base, and an immovable dividing wall formed with the perimeter walls and the base, and the perimeter walls, the base, and the dividing wall defining first and second compartments adapted to contain the contents, the drawer being movable between a drawer opened position in which contents within the drawer are accessible, and a drawer closed position in which the contents within the drawer are inaccessible, the kit comprising:

a computer configured to receive input from a user, verify the input, and generate an activating signal for a selected one of the first and second compartments based on the verified input;

a panel configured to substantially cover the drawer, thereby covering the first and second compartments within the drawer, and including first and second openings, each opening corresponding with each of the first and second compartments;

first and second covers connected to the panel, each of the covers configured to cover one and only one of the respective first and second openings;

first and second compartment illuminating devices positioned on the panel, each of the first and second compartment illuminating devices positioned adjacent each of the first and second compartments, corresponding with one of the first and second compartments, and configured to receive the activating signal from the computer, and wherein one and only one of first and second compartment illuminating device corresponding to the selected one of the first and second compartments being illuminated based on the activating signal to indicate one of the first and second compartments has been selected by the computer after the drawer has been moved into the drawer opened position;

first and second take switches, each of the first and second take switches positioned on the panel, being adjacent to a respective one of the first and second compartments, corresponding to the respective one of the first and second compartments, configured to be actuated, and configured to generate an unlocking signal when the respective one of the first and second take switches has been actuated;

first and second return switches, each of the first and second return switches positioned on the panel, being adjacent to a respective one of the first and second compartments, corresponding to the respective one of the first and second compartments, configured to be actuated, and configured to generate a return signal when one of the first and second return switches has been actuated; and a locking mechanism interconnected with the first and second covers, the locking mechanism receiving a signal based on one of the unlocking signal and the return signal to position the locking mechanism from a locked position in which both of the first and second covers are not movable such that contents contained in the first and second compartments under the respective first and second covers in the drawer cannot be withdrawn and such that contents cannot be inserted into the first and second compartments in the drawer, to an unlocked position in which one of the first and second covers is movable such that contents contained in the respective one of the first and second compartments under the respective one of first and second covers in the drawer can be withdrawn and such that contents can be inserted into the respective one of the first and second compartments under the respective one of first and second covers in the drawer;

wherein the drawer together with the panel and the first and second covers thereon have a height that is at most equal to the drawer height, and wherein the computer is further configured to record a removal of a content based on the unlocking signal, and to register an increased quantity of contents in the respective compartment based on the return signal.

2. A kit configured to be added to a cabinet configured to hold contents, the cabinet having a plurality of drawers, each drawer having a drawer height, perimeter walls, a base, and an immovable dividing wall formed with the perimeter walls and the base, and the perimeter walls, the base, and the dividing wall defining a plurality of compartments adapted to contain the contents, each of the drawers being movable between a drawer opened position in which contents within the drawer are accessible, and a drawer closed position in which the contents within the drawer are inaccessible, the kit comprising:

a computer configured to receive input from a user, verify the input, and generate an activating signal for a selected one of the plurality of compartments based on the verified input;

a panel substantially covering one of the drawers, and including a plurality of openings, each opening corresponding to one and only one of the compartments;

a plurality of covers, each of the covers coupled to the panel and movable between a closed position in which contents contained in the corresponding compartment under the cover in the drawer cannot be withdrawn and contents cannot be inserted into the compartment under the cover in the drawer, and an open position in which contents contained in the corresponding compartment under the cover in the drawer can be withdrawn and contents can be inserted into the compartment under the cover in the drawer, each of the covers disposed in a covering relationship with one and only one of the plurality of openings within the panel;

a plurality of illuminating devices positioned on the panel, each of the illuminating devices corresponding with each of the compartments, and configured to receive the activating signal from the computer and to be illuminated based on the activating signal to indicate one of the compartments has been selected by the computer after the corresponding drawer has been moved into the drawer opened position;

a plurality of take switches, each of the plurality of take switches positioned on the panel, being adjacent to a respective one of the plurality of compartments, corresponding to the respective one of the plurality of compartments, configured to be actuated, and configured to generate an unlocking signal when the respective one of the plurality of take switches has been actuated;

a plurality of return switches, each of the plurality of return switches positioned on the panel, being adjacent to a respective one of the plurality of compartments, corresponding to the respective one of the plurality of compartments, configured to be actuated, and configured to generate a return signal when one of the plurality of return switches has been actuated; and a plurality of locking mechanisms, each interconnected with one of the plurality of drawers and one and only one of the plurality of covers, each locking mechanism receiving a signal based on one of the unlocking signal and the return signal to position one and only one of the plurality of covers from a locked position in which the one and only one of the plurality of covers is not movable to an unlocked position in which the one and only one of the plurality of covers is movable;

wherein the drawer together with the panel and the cover thereon have a height that is at most equal to the drawer height, and wherein the computer is further configured to record a removal of a content based on the unlocking signal, and to register an increased quantity of contents in the respective compartment based on the return signal.

3. The kit of claim 1, wherein the computer uses an access code to generate the signal to position the locking mechanism in one of the locked and unlocked position.

4. The kit of claim 1, wherein the cover comprises at least one of a metal cover, a clear cover, and a plastic cover.

5. The kit of claim 1, wherein the locking mechanism comprises a solenoid positioned to engage the cover, and wherein the solenoid retracts and disengages from the cover.

6. The kit of claim 1, further comprising take and return switches configured to monitor a quantity of items in the compartment.

7. The kit of claim 1, wherein the computer is further configured to monitor if a correct compartment is opened and closed.

8. The kit of claim 1, further comprising an alarm configured to be set off after the cover has been opened for a preset amount of time.

9. The kit of claim 1, further comprising a detector mounted in each of the drawer, and configured to detect when the cover is opened and to send an open signal to the computer when the cover has been opened.

10. The kit of claim 2, wherein the computer uses an access code to generate the signal to position the locking mechanism in one of the locked and unlocked position.

11. The kit of claim 2, wherein the cover comprises at least one of a metal cover, a clear cover, and a plastic cover.

12. The kit of claim 2, wherein the locking mechanism comprises a solenoid positioned to engage the cover, and wherein the solenoid retracts and disengages from the cover.

13. The kit of claim 2, further comprising take and return switches configured to monitor a quantity of items in the compartment.

14. The kit of claim 2, wherein the computer is further configured to monitor if a correct compartment is opened and closed.

15. The kit of claim 2, further comprising an alarm configured to be set off after the cover has been opened for a preset amount of time.

16. The kit of claim 2, further comprising a detector mounted in each of the drawer, and configured to detect when the cover is opened and to send an open signal to the computer when the cover has been opened.

17. The kit of claim 1, wherein the illuminating devices comprise a plurality of light-emitting diodes.

18. The kit of claim 2, wherein the illuminating devices comprise a plurality of light-emitting diodes.

19. A cabinet configured to hold contents, the cabinet comprising:

at least one drawer defining a compartment, the drawer being movable between a drawer opened position, in which contents within the drawer are accessible, and a drawer closed position, in which the contents within the drawer are inaccessible;

a computer configured to receive input from a user, verify the input, and generate an activating signal for the compartment based on the verified input;

a panel substantially covering the drawer and defining an opening corresponding to the compartment;

a cover coupled to the panel and movable between a closed position, in which contents contained under the cover in the compartment in the drawer cannot be withdrawn and contents cannot be inserted under the cover into the compartment in the drawer, and an open position, in which contents contained in the compartment in the drawer can be withdrawn and contents can be inserted into the compartment in the drawer, the cover being disposed in a covering relationship with the opening in the panel;

an illuminating device positioned on the panel, the illuminating device corresponding to the compartment and being configured to receive the activating signal from the computer and to be illuminated based on the activating signal to indicate the compartment has been selected by the computer after the drawer has been moved into the drawer opened position;

a take switch positioned on the panel adjacent to the compartment, configured to be actuated, and configured to generate an unlocking signal when take switch has been actuated;

a return switch positioned on the panel adjacent to the compartment, configured to be actuated, and configured to generate a return signal when one of the return switch has been actuated; and a locking mechanism interconnected with the drawer and the cover, the locking mechanism receiving a signal based on one of the unlocking signal and the return signal to position the cover from a locked position, in which the cover is not movable, to an unlocked position, in which the cover is movable;

wherein the computer is further configured to record a removal of a content based on the unlocking signal, and to register an increased quantity of contents in the compartment based on the return signal.

* * * * *